US010280805B2

(12) United States Patent
Eckert et al.

(10) Patent No.: US 10,280,805 B2
(45) Date of Patent: May 7, 2019

(54) METHOD FOR GENERATING ENERGY, IN WHICH AN ELECTROPOSITIVE METAL IS ATOMIZED AND/OR SPRAYED AND COMBUSTED WITH A REACTION GAS, AND A DEVICE FOR CARRYING OUT SAID METHOD

(71) Applicant: Siemens Aktiengesellschaft, Munich (DE)

(72) Inventors: Helmut Eckert, Roettenbach (DE); Guenter Schmid, Hemhofen (DE); Dan Taroata, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 123 days.

(21) Appl. No.: 15/511,270

(22) PCT Filed: Sep. 11, 2015

(86) PCT No.: PCT/EP2015/070828
§ 371 (c)(1),
(2) Date: Mar. 15, 2017

(87) PCT Pub. No.: WO2016/045992
PCT Pub. Date: Mar. 31, 2016

(65) Prior Publication Data
US 2017/0284227 A1  Oct. 5, 2017

(30) Foreign Application Priority Data
Sep. 24, 2014 (DE) .................. 10 2014 219 276

(51) Int. Cl.
*F01K 3/18* (2006.01)
*F24V 30/00* (2018.01)
(Continued)

(52) U.S. Cl.
CPC .............. *F01K 3/188* (2013.01); *F01K 21/04* (2013.01); *F01K 23/02* (2013.01); *F23C 9/00* (2013.01);
(Continued)

(58) Field of Classification Search
CPC .......... F01K 3/188; F01K 23/02; F01K 21/04; F24V 30/00; F23C 99/00; F23C 9/00;
(Continued)

(56) References Cited

U.S. PATENT DOCUMENTS 5,086,720 A * 2/1992 Gibran ..................... F23B 7/00
110/234
5,867,978 A * 2/1999 Klanchar ................ C01B 3/065
165/169
(Continued)

FOREIGN PATENT DOCUMENTS

CN     85107486 A      5/1987  ............... C01C 1/02
DE  102008031437 A1   1/2010  ............... C05D 9/00
(Continued)

OTHER PUBLICATIONS

Chinese Office Action, Application No. 201580051574.4, 9 pages, dated Jul. 3, 2018.
(Continued)

*Primary Examiner* — Hoang M Nguyen
(74) *Attorney, Agent, or Firm* — Slayden Grubert Beard PLLC

(57) ABSTRACT

The present disclosure relates to a method of generating energy. The teachings thereof may be embodied in a method comprising: atomizing an electropositive metal; combusting the metal with a reaction gas; mixing the resulting combustion products with water, or an aqueous solution, or a suspension of a salt of the metal; separating a resulting mixture into (a) solid and liquid constituents and (b) gaseous (Continued)

constituents; at least partly converting energy from the separated constituents. Mixing the combustion products may include: atomizing liquid or gaseous water; or atomizing or nebulizing an aqueous solution or a suspension of a salt of the electropositive metal, into the reacted mixture.

17 Claims, 3 Drawing Sheets

(51) Int. Cl.
*F01K 23/02* (2006.01)
*F23C 99/00* (2006.01)
*F01K 21/04* (2006.01)
*F23J 15/02* (2006.01)
*F23C 9/00* (2006.01)

(52) U.S. Cl.
CPC ............ *F23C 99/00* (2013.01); *F23J 15/022* (2013.01); *F24V 30/00* (2018.05); *F23B 2900/00003* (2013.01); *F23J 2217/102* (2013.01); *F23J 2217/40* (2013.01); *Y02E 20/16* (2013.01); *Y02E 20/18* (2013.01)

(58) Field of Classification Search
CPC .. F23J 15/022; F23J 2217/102; F23J 2217/40; Y02E 20/18; Y02E 20/16; F23B 2900/00003
USPC ............................................ 60/39.15, 39.182
See application file for complete search history.

(56) References Cited

U.S. PATENT DOCUMENTS

| | | | | |
|---|---|---|---|---|
| 7,430,866 | B1 * | 10/2008 | Lynch | F01K 27/02 60/645 |
| 8,656,724 | B2 * | 2/2014 | Cawley | F01K 21/04 60/39.55 |
| 9,285,116 | B2 | 3/2016 | Schmid et al. | |
| 2011/0252800 | A1 | 10/2011 | Cawley et al. | 60/645 |
| 2013/0065187 | A1 | 3/2013 | Yoon | 431/2 |
| 2013/0178677 | A1 * | 7/2013 | Schmid | B01D 53/62 585/325 |
| 2013/0260263 | A1 | 10/2013 | Schmid | 429/400 |
| 2014/0072836 | A1 * | 3/2014 | Mills | C25B 1/04 429/8 |

FOREIGN PATENT DOCUMENTS

| | | | | |
|---|---|---|---|---|
| DE | 102009014026 A1 | 6/2010 | ............. | F23B 90/00 |
| DE | 102010041033 A1 | 3/2012 | ............. | F23C 9/00 |
| EP | 0993855 B1 | 4/2000 | ............. | F01K 23/16 |
| WO | 2011/076994 A1 | 6/2011 | ............. | F22B 31/08 |
| WO | 2012/038330 A2 | 3/2012 | ............. | B01D 53/62 |
| WO | 2013/156476 A1 | 10/2013 | ............. | B01D 53/50 |
| WO | 2016/045992 A1 | 3/2016 | ............. | F01K 21/04 |

OTHER PUBLICATIONS

German Office Action, Application No. 102014219276.5, 7 pages, dated Apr. 20, 2015.
International Search Report and Written Opinion, Application No. PCT/EP2015/070828, 14 pages, dated Nov. 27, 2015.
European Office Action, Application No. 15770465.1, 6 pages, dated Feb. 19, 2019.

* cited by examiner

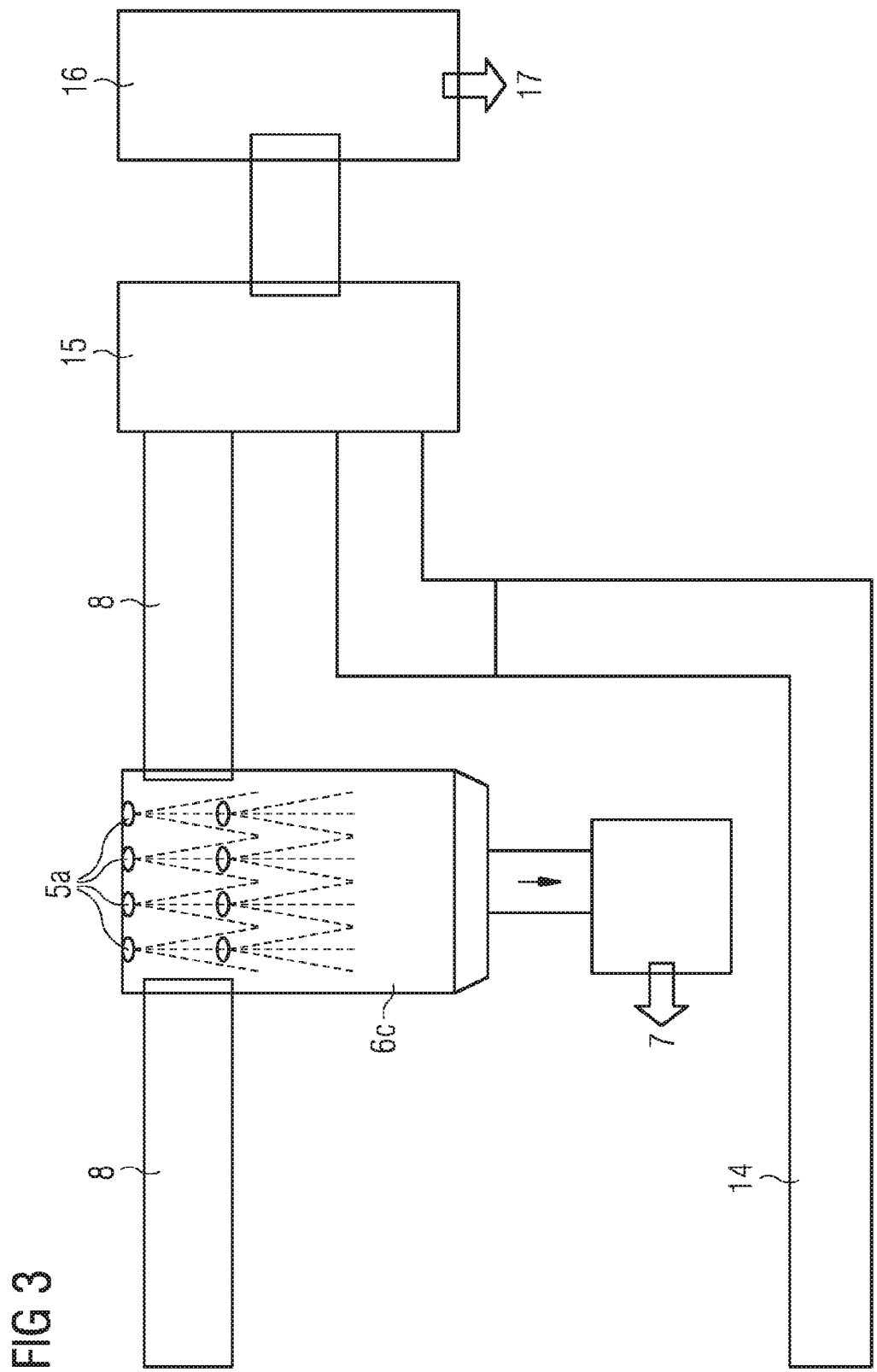

METHOD FOR GENERATING ENERGY, IN WHICH AN ELECTROPOSITIVE METAL IS ATOMIZED AND/OR SPRAYED AND COMBUSTED WITH A REACTION GAS, AND A DEVICE FOR CARRYING OUT SAID METHOD

CROSS-REFERENCE TO RELATED APPLICATIONS

This application is a U.S. National Stage Application of International Application No. PCT/EP2015/070828 filed Sep. 11, 2015, which designates the United States of America, and claims priority to DE Application No. 10 2014 219 276.5 filed Sep. 24, 2014, the contents of which are hereby incorporated by reference in their entirety.

TECHNICAL FIELD

The present disclosure relates to a method of generating energy. The teachings thereof may be embodied in a method wherein an electropositive metal is atomized and/or nebulized and combusted with a reaction gas comprising carbon dioxide and/or water.

BACKGROUND

Standard combined cycle power plants burn fossil fuels. Fossil fuels are also indirectly combusted in standard IGCC (integrated gasification combined cycle) plants, even though typically only $H_2$, CO, or a mixture thereof (syngas) arrives at the gas turbine. The necessity of reducing carbon dioxide emissions has led to discussion of various ways of generating energy from alternative resources.

DE102008031437.4 describes how it is possible to create fully recyclable energy cycles with alkali metals. This has been elaborated in detail in WO2012/038330 and WO2013/156476. The combustion of electropositive metals, such as lithium, sodium, potassium, magnesium, calcium, strontium, barium, aluminum, or zinc is possible in carbon dioxide ($CO_2$) or water ($H_2O$) as well as air. This forms the chemical base materials carbon monoxide (CO) or hydrogen ($H_2$).

This combustion is shown by way of example for lithium in the following reaction equations:

$Li + CO_2 \rightarrow 1/2\ Li_2CO_3 + 1/2\ CO - 270\ kJ$

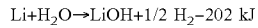

$Li + H_2O \rightarrow LiOH + 1/2\ H_2 - 202\ kJ$

Each of the reactions can be utilized to produce the maximum possible thermal energy in a power plant operation similar to a combined cycle (gas and steam) power plant, in the manner of reconversion to power in a gas turbine or additionally in two steam turbines coupled thereto.

SUMMARY

However, there is a need to efficiently obtain energy, especially electrical energy, from electropositive metals such as alkali metals as recyclable energy carriers with standard components such as steam turbines or expanders from gas turbines. The resultant materials of value, CO or $H_2$ etc., can be utilized chemically. Overall, it would then be possible here to achieve an emissions-free plant.

Some embodiments may include methods of generating energy, wherein an electropositive metal selected from alkali metals, alkaline earth metals, aluminum and zinc, and mixtures and/or alloys thereof, is atomized and/or nebulized and combusted with a reaction gas comprising carbon dioxide and/or water, the reacted mixture of reaction gas and electropositive metal is mixed with water and/or an aqueous solution and/or suspension of a salt of the electropositive metal, the mixture that has been mixed with water and/or the aqueous solution and/or suspension of a salt of the electropositive metal is separated into solid and/or liquid constituents on the one hand and gaseous constituents on the other hand, and energy from the solid and/or liquid constituents on the one hand and the gaseous constituents on the other hand is at least partly converted, wherein the mixing of the reacted mixture of reaction gas and electropositive metal with water and/or an aqueous solution and/or suspension of a salt of the electropositive metal is effected by atomizing liquid and/or gaseous water and/or atomizing and/or nebulizing an aqueous solution and/or suspension of a salt of the electropositive metal into the reacted mixture.

In some embodiments, the separation into solid and/or liquid constituents (7) on the one hand and gaseous constituents (8) on the other hand is effected by means of a cyclone and/or filter plates and/or electrostatic filters.

In some embodiments, the at least partial conversion of the energy from the solid and/or liquid constituents (7) is effected with the aid of at least one heat exchanger.

In some embodiments, the at least partial conversion of energy from the gaseous constituents (8) to electrical energy is effected by means of at least one turbine, preferably at least two turbines in succession in flow direction of the gaseous constituents, and at least one generator.

In some embodiments, the electropositive metal is combusted with an excess of carbon dioxide and/or water.

In some embodiments, excess carbon dioxide and/or excess water is separated from the gaseous constituents (8) after the combustion and recycled to the combustion.

Some embodiments may include apparatus for generating energy, having: a first reactor (1) in which an electropositive metal selected from alkali metals, alkaline earth metals, aluminum and zinc, and mixtures and/or alloys thereof, is allowed to react with a reaction gas comprising carbon dioxide and/or water, said reactor being designed to react the reaction gas comprising carbon dioxide and/or water with the electropositive metal; at least one first atomization unit and/or nebulization unit (2a) for atomizing and/or nebulizing the electropositive metal, said unit being designed to atomize and/or nebulize the electropositive metal into the first reactor; at least one first feed unit (2) for the electropositive metal, said unit being designed to feed the electropositive metal to the at least one first atomization unit and/or nebulization unit (2a); at least one second feed unit (3) for reaction gas comprising carbon dioxide and/or water, said unit being designed to feed the first reactor with the reaction gas comprising carbon dioxide and/or water; a second reactor (4) in which the reacted mixture of reaction gas and electropositive metal is mixed with water and/or an aqueous solution and/or suspension of a salt of the electropositive metal, said reactor being designed to mix the reacted mixture of reaction gas and electropositive metal with water and/or the aqueous solution and/or suspension of a salt of the electropositive metal; at least one second atomization unit and/or nebulization unit (5) for atomizing and/or nebulizing water and/or the aqueous solution and/or suspension of a salt of the electropositive metal, said unit being designed to atomize and/or nebulize water and/or the aqueous solution and/or suspension of a salt of the electropositive metal into the second reactor; at least one third feed unit for water and/or an aqueous solution and/or suspension of a salt of the electropositive metal, said unit being designed to feed the at least one second atomization unit and/or nebulization unit (5) with water and/or the aqueous solution and/or suspension of a salt of the electropositive metal; a first separation unit (6) in which the mixture that has been mixed with water and/or the aqueous solution and/or suspension of a salt of the electropositive metal is separated into solid and/or liquid constituents (7) on the one hand and gaseous constituents (8) on the other hand, said unit being designed to separate the mixture that has been mixed with water and/or the aqueous solution and/or suspension of a salt of the electropositive metal into solid and/or liquid constituents (7) on the one hand and gaseous constituents (8) on the other hand; at least one first unit (9) for conversion of energy, said unit being designed to at least partly convert the energy from the solid and/or liquid constituents (7); and at least one second unit (10) for conversion of energy, said unit being designed to at least partly convert the energy from the gaseous constituents (8).

Some embodiments may include a second separation unit in which water and/or carbon dioxide is separated from the gaseous constituents, said unit being designed to separate water and/or carbon dioxide from the gaseous constituents.

In some embodiments, the first separation unit (6) has a cyclone (6a) and/or at least one filter plate and/or at least one electrostatic filter (6b).

In some embodiments, the at least one first unit (9) has at least one heat exchanger (9a) for conversion of energy.

In some embodiments, the at least one second unit (10) for conversion of energy has at least one turbine (10a) and at least one generator (10b) for generation of electrical energy, and preferably has at least two turbines (10a; 10c) in succession in flow direction of the gaseous constituents.

Some embodiments may include a recycle unit (13) for water and/or carbon dioxide from the second separation unit, said recycle unit being designed to feed water and/or carbon dioxide from the second separation unit to the second feed unit (3) for reaction gas and/or to the first reactor (1).

Some embodiments may include a return line (12), a return valve (12a) and at least one fourth feed unit (12b) for water and/or $H_2$ and/or carbon dioxide and/or CO, wherein water and/or $H_2$ and/or carbon dioxide and/or CO are at least partly removed from the gaseous constituents via the return valve (12a), are recycled via the return line (12) and are fed via the at least one fourth feed unit (12b) to the first reactor (1) and/or to the at least one second feed unit (3) for reaction gas comprising carbon dioxide and/or water and/or to the second reactor (4) and/or to the at least one second atomization unit and/or nebulization unit (5) for atomization and/or nebulization of water and/or the aqueous solution and/or suspension of a salt of the electropositive metal and/or to the at least one third feed unit for water and/or an aqueous solution and/or suspension of a salt of the electropositive metal.

Some embodiments may include at least one $CO_2$ scrubber and/or at least one fifth feed unit for CO and/or $H_2$ and/or $H_2O$ and/or at least one drier and/or a Fischer-Tropsch synthesis apparatus.

BRIEF DESCRIPTION OF THE DRAWINGS

The appended drawings are intended to illustrate embodiments of the present disclosure and impart further understanding thereof. In connection with the description, they serve to illustrate concepts and principles of the invention. Other embodiments and many of the advantages mentioned are apparent with regard to the drawings. The elements of the drawings are not necessarily shown to scale with respect to one another. Elements, features and components that are identical, have the same function and the same effect are each given the same reference numerals in the figures of the drawings, unless stated otherwise.

FIG. 3 shows, in schematic form, a third illustrative embodiment of an alkali metal power plant connected to a Fischer-Tropsch synthesis and a $CO_2$ scrubber, which may be similar to an IGCC plant in accordance with the teachings of the present disclosure.

DETAILED DESCRIPTION

Figure 1:
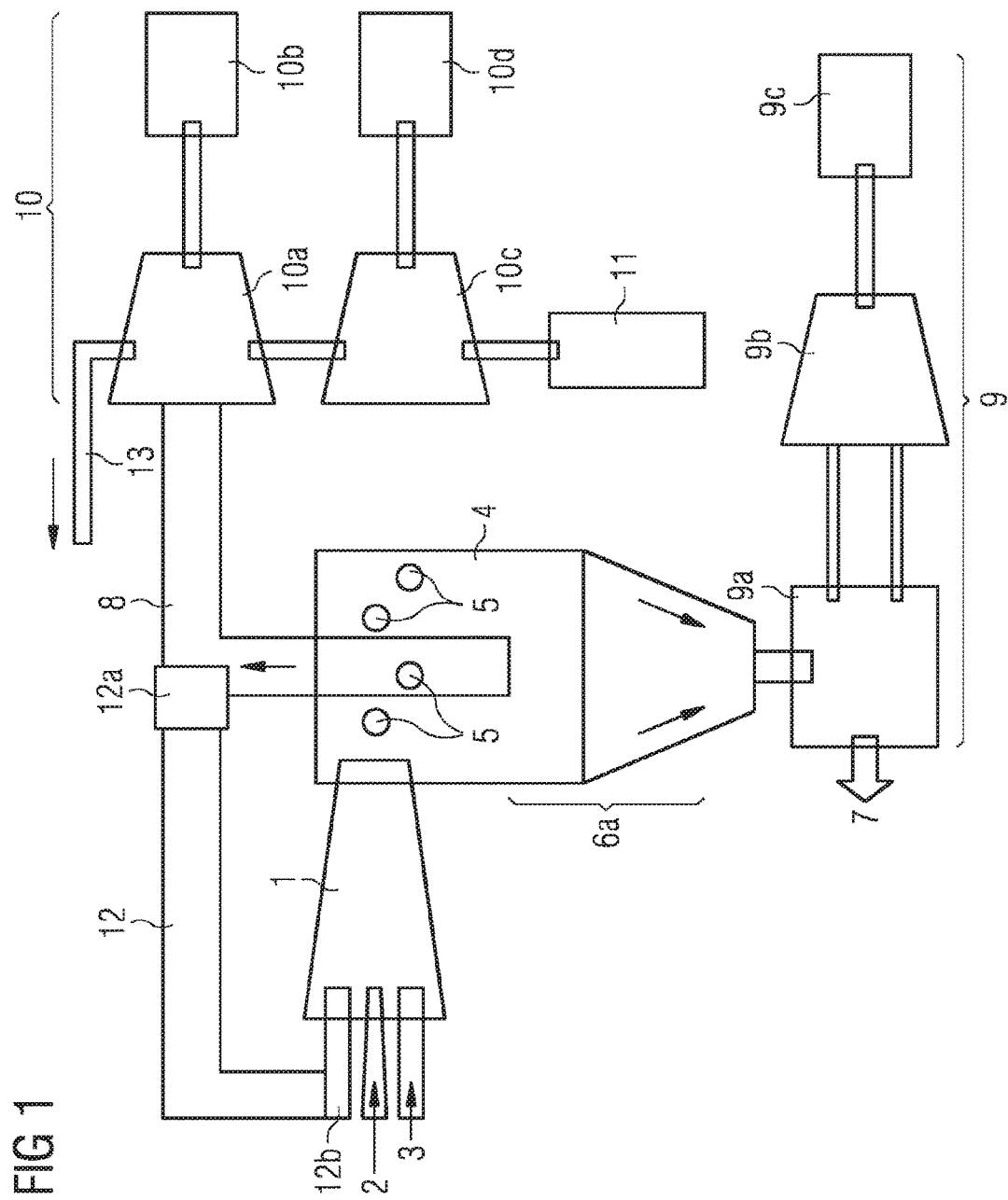
FIG. 1 shows, in schematic form, a first illustrative embodiment of an apparatus of the invention in the form of a coupled combined cycle/alkali metal power plant for generation of electricity with a cyclone for removal of the gaseous products in accordance with the teachings of the present disclosure.

The teachings of the present disclosure may be used in power plant systems to enable effective reconversion to power of the energy stored in electropositive metals, or which can supply the materials of value generated in the combustion process to a chemical utilization. An effective reaction regime and improved yield can be achieved from an energy point of view when a reaction mixture composed of a reaction gas comprising carbon dioxide and/or water and an electropositive metal is supplied, in the course of or after the reaction, with water and/or an aqueous solution and/or suspension of a salt of an electropositive metal selected from alkali metals, alkaline earth metals, aluminum, and zinc, mixtures, and/or alloys thereof; the reacted mixture of reaction gas and electropositive metal is mixed with water and/or an aqueous solution and/or suspension of a salt of the electropositive metal.

In some embodiments, methods of generating energy may include an electropositive metal selected from alkali metals, alkaline earth metals, aluminum and zinc, and mixtures and/or alloys thereof, is atomized and/or nebulized and combusted with a reaction gas comprising carbon dioxide and/or water, the reacted mixture of reaction gas and electropositive metal is mixed with water and/or an aqueous solution and/or suspension of a salt of the electropositive metal, the mixture that has been mixed with water and/or the aqueous solution and/or suspension of a salt of the electropositive metal is separated into solid and/or liquid constituents on the one hand and gaseous constituents on the other hand, and the energy from the solid and/or liquid constituents on the one hand and the gaseous constituents on the other hand is at least partly converted, wherein the mixing of the reacted mixture of reaction gas and electropositive metal with water and/or an aqueous solution and/or suspension of a salt of the electropositive metal is effected by atomizing and/or nebulizing liquid or gaseous water and/or an aqueous solution and/or suspension of a salt of the electropositive metal into the reacted mixture.

In some embodiments, an apparatus for generating energy may include: a first reactor in which an electropositive metal selected from alkali metals, alkaline earth metals, aluminum and zinc, and mixtures and/or alloys thereof, is allowed to react with a reaction gas comprising carbon dioxide and/or water, said reactor being designed to react the reaction gas comprising carbon dioxide and/or water with the electropositive metal; at least one first atomization unit and/or nebulization unit for atomizing and/or nebulizing the electropositive metal, said unit being designed to atomize and/or nebulize the electropositive metal into the first reactor; at least one first feed unit for the electropositive metal, said unit being designed to feed the electropositive metal to the at least one first atomization unit and/or nebulization unit; at least one second feed unit for reaction gas comprising carbon dioxide and/or water, said unit being designed to feed the first reactor with the reaction gas comprising carbon dioxide and/or water; a second reactor in which the reacted mixture of reaction gas and electropositive metal is mixed with water and/or an aqueous solution and/or suspension of a salt of the electropositive metal, said reactor being designed to mix the reacted mixture of reaction gas and electropositive metal with water and/or the aqueous solution and/or suspension of a salt of the electropositive metal; at least one second atomization unit and/or nebulization unit for atomizing and/or nebulizing water and/or the aqueous solution and/or suspension of a salt of the electropositive metal, said unit being designed to atomize and/or nebulize water and/or the aqueous solution and/or suspension of a salt of the electropositive metal into the second reactor; at least one third feed unit for water and/or an aqueous solution and/or suspension of a salt of the electropositive metal, said unit being designed to feed the at least one second atomization unit with water and/or the aqueous solution and/or suspension of a salt of the electropositive metal; a first separation unit in which the mixture that has been mixed with water and/or the aqueous solution and/or suspension of a salt of the electropositive metal is separated into solid and/or liquid constituents on the one hand and gaseous constituents on the other hand, said unit being designed to separate the mixture that has been mixed with water and/or the aqueous solution and/or suspension of a salt of the electropositive metal into solid and/or liquid constituents on the one hand and gaseous constituents on the other hand; at least one first unit for conversion of energy, said unit being designed to at least partly convert the energy from the solid and/or liquid constituents; and at least one second unit for conversion of energy, said unit being designed to at least partly convert the energy from the gaseous constituents.

The present disclosure may enable a method of generating energy, wherein an electropositive metal selected from alkali metals, alkaline earth metals, aluminum and zinc, and mixtures and/or alloys thereof, is atomized and/or nebulized and combusted with a reaction gas comprising carbon dioxide and/or water, the reacted mixture of reaction gas and electropositive metal is mixed with water and/or an aqueous solution and/or aqueous suspension of a salt of the electropositive metal, the mixture that has been mixed with water and/or the aqueous solution and/or aqueous suspension of a salt of the electropositive metal is separated into solid and/or liquid constituents on the one hand and gaseous constituents on the other hand, and the energy from the solid and/or liquid constituents on the one hand and the gaseous constituents on the other hand is at least partly converted, wherein the mixing of the reacted mixture of reaction gas and electropositive metal with water and/or an aqueous solution and/or aqueous suspension of a salt of the electropositive metal is effected by atomizing liquid and/or gaseous water and/or an aqueous solution and/or aqueous suspension of a salt of the electropositive metal into the reacted mixture.

The reference to an aqueous solution and/or suspension of a salt of the electropositive metal refers to an aqueous solution of a salt of the electropositive metal and/or an aqueous suspension of a salt of the electropositive metal.

An at least partial conversion of the energy from the solid and/or liquid constituents on the one hand and the gaseous constituents on the other hand comprises any at least partial conversion of the energy, for example thermal and/or kinetic energy, released and/or present in the reaction of electropositive metal and reaction gas and mixing with water and/or an aqueous solution and/or aqueous suspension of a hydroxide of the electropositive metal to another form of energy, for example power. For example, the energy can be converted to thermal energy in another medium, such as water, for example in a heat exchanger, or to electrical energy. The amount of energy converted may depend here on various factors, such as efficiencies of the devices used for conversion, any energy losses in the system, the control of the reaction and the streams of matter, etc.

In some embodiments, the electropositive metal is selected from alkali metals, preferably Li, Na, K, Rb and Cs, alkaline earth metals, e.g., Mg, Ca, Sr, and Ba, Al, Zn, and mixtures and/or alloys thereof. In some embodiments, the electropositive metal is selected from Li, Na, K, Mg, Ca, Sr, Ba, and Zn. Also possible are mixtures and/or alloys of the electropositive metal.

The reaction gas comprises carbon dioxide and/or water to enable the reaction of carbon dioxide and/or water and the electropositive metal, e.g., with no further gases in the reaction gas that react with the electropositive metal under the process conditions, for example, noble gases or other inert gases, for example nitrogen, under the corresponding conditions, but a minimum amount of oxygen, if any. In some embodiments, the reaction gas comprises more than 50% by volume of carbon dioxide and/or water, more than 75% by volume of carbon dioxide and/or water, more than 90% by volume of carbon dioxide and/or water, and/or more than 95% by volume of carbon dioxide and/or water.

It some embodiments the reaction gas comprises only water or only carbon dioxide or a mixture of water and carbon dioxide, which can be adjusted suitably—for example with regard to a Fischer-Tropsch synthesis. In some embodiments, the reaction gas consists of carbon dioxide and/or water, apart from unavoidable impurities which can arise, for example, in the separation of carbon dioxide and/or water from air and/or offgas, through direct injection of water or flue gas, or in some other way. In the case of reaction gases in which the gas present in addition to carbon dioxide and/or water can react with the electropositive metal (e.g., $O_2$, $CO_2$), for example in a separation of carbon dioxide and/or water from air or offgas for production of the reaction gas, resulting in proportions of carbon dioxide and/or water of >90% by volume, or >95% by volume.

The atomization and/or the nebulization of the electropositive metal can be effected in a suitable manner, for example by means of standard nozzles or atomizers, but also by atomizing/nebulizing through open-pore structures such as a pore burner. In some embodiments, both nebulization and atomization of the electropositive metal take place into the reaction space, for example by means of various feed devices with nozzles or nebulizers. For example, for the alkaline earth metals, especially Ca and/or Mg, it may include nebulization in powder form.

In some embodiments, the reacted mixture of reaction gas and electropositive metal need not have reacted fully prior to mixing with water and/or an aqueous solution and/or suspension of a salt of the electrode positive metal; instead, a reaction can also take place in the course of mixing or thereafter.

Thus, the reaction of electropositive metal with the reaction gas may or may not have run to completion prior to the mixing with water and/or an aqueous solution and/or suspension of a salt of the electropositive metal, and so there may still also be a reaction of electropositive metal with water, such that hydrogen may form, possibly additional hydrogen, which can then remain in the system or can be removed with the gaseous products.

The salt in the aqueous solution and/or suspension for mixing may corresponds to the electropositive metal used in the reaction. The anion in the salt may include a carbonate, hydrogencarbonate, and/or hydroxide. Thus, in the case of a reaction gas comprising carbon dioxide, it may include a carbonate and/or hydrogencarbonate, according to the solubility of the salt, e.g., a hydroxide in the case of a reaction gas comprising water. However, it is also possible to use a salt which is more soluble in water than the corresponding carbonate, hydrogencarbonate and/or hydroxide, in which case, however, the anion of this salt remains in the system and may need to be removed. The aqueous solution and/or suspension of the salt of the electropositive metal may comprise further constituents as well as the salt and water, for example various additives for stabilization of the solution/suspension, especially defoamers or other additives such as crystallization aids for establishing particular product properties (morphology).

In some embodiments, combustion of electropositive metal, for example lithium, can be effected, for example, in a reaction gas comprising water and/or carbon dioxide in such a way that the amount of water and/or carbon dioxide is chosen such that the burner does not overheat overall. For this purpose, there may be an integrated valve that can regulate the water content and/or carbon dioxide content in the course of combustion. It is thus also possible to enable, for example, running of power generation in a turbine, for example, with pure hydrogen with integrated water dilution.

In some embodiments, the electropositive metal has been depleted with the reaction gas prior to the mixing with water and/or an aqueous solution and/or suspension of a salt of the electropositive metal, meaning that the electropositive metal has reacted quantitatively with the reaction gas, in order to avoid the formation of hydrogen, possibly additional hydrogen when water is used as reaction gas. The use of an excess of reaction gas, especially an excess of carbon dioxide and/or water, for depletion of the electropositive metal may be used in particular embodiments.

The mixing with water and/or an aqueous solution and/or suspension of a salt of the electropositive metal can be effected by atomizing liquid or gaseous water and/or by atomizing and/or nebulizing an aqueous solution and/or suspension/aqueous suspension of a salt of the electropositive metal in a suitable manner. In some embodiments, atomization/nebulization is effected in such a way that the reacted reaction gas is sprayed as completely as possible with water and/or the solution and/or suspension of a salt of the electropositive metal. This can be effected, for example, by means of one or more nozzles/nebulizers. By means of a suitable connection of the mixing of the reacted mixture of reaction gas and electropositive metal with water and/or an aqueous solution and/or aqueous suspension of a salt of the electropositive metal on the one hand with the separation of the gaseous from the solid and/or liquid constituents on the other hand, it is possible in particular embodiments to guide enrichment of the solid and/or liquid constituents in such a way that these are enriched in the separation apparatus, and the hydrolysis/removal of the solids produced, for example hydroxides and/or carbonates and possibly hydrogencarbonates, can be localized, such that the atomizing/nebulizing can be controlled.

The atomizing and/or nebulizing of the water and/or the aqueous solution and/or suspension of a salt of the electropositive metal can be effected in a suitable manner, for example by means of nozzles or nebulizers. For example, the water can be atomized as a liquid or gas. The aqueous solution of a salt of the electropositive metal can likewise be atomized in a suitable manner, whereas the aqueous suspension of the salt of the electropositive metal can be atomized or nebulized according to the solids content of the suspension. The atomization/nebulization of an aqueous suspension of a salt of the electropositive metal can assure good heat transfer, and so a proportion of solids is favorable. A higher proportion of solids/solids content in the aqueous suspension may be useful in particular embodiments, although suitable spraying or nebulizing has to be assured. The proportion of solids can be adjusted suitably according to the reaction system and apparatus.

In some embodiments, water is atomized in liquid and gaseous form and, at the same time, an aqueous solution of a salt of the electropositive metal is atomized and an aqueous suspension of a salt of the electropositive metal is atomized and/or nebulized, but the introduction of water, aqueous solution and/or aqueous suspension can also be combined in some other way, for example by atomization of water and an aqueous solution of a salt of the electropositive metal.

The mixing with water and/or an aqueous solution and/or suspension of a salt of the electropositive metal can possibly further produce a hydroxide of the electropositive metal reacted in the combustion from the reaction products, for example carbonates. The reaction product from the combustion, e.g., carbonate, hydrogencarbonate, and/or hydroxide, can be removed by means of the water and/or the aqueous solution and/or suspension of a salt of an electropositive metal, for example as a suspension or in solution. In this mixing, it is additionally possible in some cases for further energy to be released through formation of the salt, which can additionally at least partly be converted, for example, to thermal and/or electrical energy, in addition to the energy already present as a result of the reaction of the electropositive metal with the reaction gas. The reactions give rise not only to the heat of reaction but also to pressure, for example as a result of evaporation of water, which can likewise be utilized. In addition, it is also possible for energy of hydration and/or lattice energy to be released.

For example, in the case of deposition of the solid combustion product $Li_2CO_3$ in the case of combustion of Li as the electropositive metal, with additional metered addition of water, for example in a deposition cyclone, the lattice energy can additionally be obtained, whereas, in the case of the combustion product LiOH, which has good water solubility, for example, the energy of hydration can be released (lithium −509 kJ/mol).

In the hydrolysis of the carbonate and/or hydrogencarbonate, in particular embodiments, it is thus possible, as well as the energy of hydrolysis, for the energy of hydration of the electropositive metal and/or lattice energy to be additionally released, and for energy of hydration, for example, to be released in the production of hydroxides, or for the hydrolysis to be distributed between a first reactor and a second reactor for better reaction control. This depends here on the electropositive metals used and the reaction gas used.

In the case of metered addition of water and/or an aqueous solution and/or suspension of a salt of the electropositive metal, it is additionally already possible, in a first separation unit, to separate out a solution or suspension of a salt, for example an LiOH solution/suspension, which can be sold as a product of value or reused in the present method. In the case of use of carbon dioxide in the reaction gas, it is alternatively or solely possible to separate out and remove carbonates and/or hydrogen carbonates in solution and/or suspension, for example an $Li_2CO_3$ suspension or sodium hydrogencarbonate suspension and/or solution.

The step of mixing with water and/or an aqueous solution and/or suspension of a salt of the electropositive metal may provide one or more advantages, for example:
a) The temperature in the system can be kept at a level acceptable for the materials.
b) The water evaporates and thus increases the inlet pressure in a downstream energy generation from the gaseous constituents, for example using a turbine, for example a gas, steam and/or expander turbine. Analogously to a steam turbine, the evaporated water thus provides the "mechanical" energy transfer for the turbine.
c) The upstream first reactor or burner for combustion of electropositive metal and reaction gas, for example Li or Mg and $H_2O$ and/or $CO_2$, may be less powerful, since additional energy is released in the hydration, which is also gentle on the material of the first reactor.
d) The atomized water can wash the hydroxide and/or carbonate and/or hydrogencarbonate of the electropositive metal that has formed, for example of an alkali metal such as lithium, out of a separating unit such as a cyclone, such that the gaseous constituents that have formed and are to be removed, for example $H_2/H_2O$ and/or $CO/CO_2/H_2O$, can be guided in largely and preferably completely particle-free form to a turbine. Separation with a liquid is very effective here, as also apparent from the illustrative solubilities of lithium hydroxide in water below, but no figures are given for higher temperatures which may be present in the reactor and may be present for generation of sufficient steam for operation of the turbine. Solubilities of lithium hydroxide in water:
12.7 g/100 mL (0° C.)
12.8 g/100 mL (20° C.)
17.5 g/100 mL (100° C.)
e) The plant/apparatus can be run in such a way that the hydroxide solution/suspension that emerges downstream of the first separation unit, which may be under pressure, for example, has the temperature necessary for a conversion of energy, for example with the aid of a heat exchanger for raising steam, such that it is then also possible to operate a steam turbine, for example. Optionally, such a second steam turbine can also be coupled to an additional drive train of the first turbine which is operated with the gaseous constituents, for example from the gas turbine.
f) The gas mixture formed, for example comprising $H_2/H_2O$ and/or $CO/CO_2/H_2O$, does not contain any oxygen and is therefore not corrosive.
g) Excess $H_2O$ and/or $CO_2$ can be recycled into the process, since further constituents can be removed efficiently.
h) The energy released in the exothermic reactions can be released in the separation into solid and/or liquid constituents on the one hand and gaseous constituents on the other hand, for example in condensers in a cyclone or in other separation units, and the low-temperature heat released can be used for preheating or as district heating. Such waste heat can also be obtained, for example, from the gaseous constituents.
i) A hydroxide solution withdrawn in liquid form, for example alkali metal hydroxide solution, can assume various further tasks. The electropositive metal can also be recovered again therefrom in a suitable manner. For example, completely recyclable energy cycles arise, for example, for Li via $Li_2CO_3$ recycling to LiCl, as specified, for example, in US20130001097A1, and subsequent electrolysis to give Li. In the case of use of Ca, for example, as the electropositive metal, $Ca(OH)_2$ formed can serve for desulfurization of conventional fossil power plants.

The salt of the electropositive metal may contain one or more of the above electropositive metals. The electropositive metal in the salt may be different than that which reacts in the reaction of the electropositive metal and reaction gas or be the same. In some embodiments, the electropositive metal of the salt is the same which is left to react with the reaction gas, in order not to have various electropositive metals present in the products produced, which may then need to be separated in a complex manner. An exception to this is when what are called double salts are to be produced in the method.

The at least partial conversion of energy may comprise, for example, conversion to thermal and/or electrical energy. In particular embodiments, the methods and the apparati described produce at least electrical energy.

Separation of $CO_2$ and/or $H_2O$ from the gaseous constituents, which can be effected in particular embodiments, can be effected in a suitable manner. For example, water and/or carbon dioxide can be removed, for example condensed, together with excess water in the form of water or an aqueous solution. Another conceivable example is removal of water and/or carbon dioxide by condensation. If appropriate, water and/or carbon dioxide can also be released into the environment, for example under economic considerations.

The atomizing and/or nebulizing of liquid and/or gaseous water and/or an aqueous solution and/or suspension of a salt of the electropositive metal is not particularly restricted in accordance with the invention with regard to the amount of water and/or aqueous solution and/or suspension of the salt of the electropositive metal. In particular embodiments, the temperature and/or the amount of the water and/or the aqueous solution and/or suspension of a salt of the electropositive metal is adjusted such that the heat of reaction from the exothermic reaction is removed by reaction gas and electropositive metal in a suitable manner, such that the apparatus for the reaction is not subjected to excessive stress and the mechanical and thermal energy yield is maximized.

In some embodiments, the separation into solid and/or liquid constituents on the one hand and gaseous constituents on the other hand is effected by means of a cyclone and/or filter plates and/or electrostatic filters. Separation can also be effected, for example, by means of a cyclone with filter plates or at least one electrostatic filter provided therein. The cyclone, the filter plates, and/or the electrostatic filters can be provided in a suitable manner. In this case, a cyclone reactor can also serve as reactor for the atomization of the water or the aqueous solution of a salt of the electropositive metal, meaning that water can, for example, also be metered into the cyclone in addition to the water and/or aqueous suspension/solution atomized beforehand. The electrostatic filter used may, for example, be a high-efficiency, for example washable, electrostatic filter made, for example, from plates or wires, in which nozzles, for example, may also be present for introduction of water.

By means of the suitable connection of the mixing of the reacted mixture of reaction gas and electropositive metal with water and/or an aqueous solution and/or aqueous suspension of a salt of the electropositive metal on the one hand with the separation of the gaseous from the solid and/or liquid constituents on the other hand by means of a cyclone and/or filter plates and/or electrostatic filters, it is possible in particular embodiments to guide enrichment of the solid and/or liquid constituents in such a way that these are enriched in the separation apparatus, and the hydrolysis of the nitrides produced can be localized, such that the atomizing/nebulizing can be controlled. For example, by means of the cyclone, it is possible to enrich the solid constituents in the outer region of the cyclone or in a plate filter, such that the hydrolysis can be very controlled.

The at least partial conversion of energy from the solid and/or liquid constituents which may have temperatures, for example, of 300° C. or more can be effected with the aid of at least one heat exchanger in particular embodiments. This heat exchanger can then provide thermal energy, for example. It is also possible that steam, for example, is generated in the heat exchanger and drives a turbine and a generator, for example, to generate electrical energy. It is also possible that, with the aid of the heat exchanger, both thermal energy and electrical energy are generated. The thermal energy can serve, for example, to preheat the electropositive metal and/or the reaction gas prior to the reaction, such that it is also possible, for example, to provide the electropositive metal in liquid form and/or to preheat the water and/or the aqueous solution and/or suspension of a salt of the electropositive metal as desired. The thermal energy can alternatively be used for other purposes, for example district heating. The electrical energy obtained can also be used in a suitable manner, for example to supply power.

The molar ratio of water, for example in the solution and/or suspension of the salt of the electropositive metal as well, to carbonate and/or hydrogencarbonate and/or hydroxide formed in the combustion of reaction gas and electropositive metal, in particular embodiments, is greater than 2:1, greater than 3:1, or greater than 3.5:1. In particular embodiments, the molar ratio of water, for example in the solution and/or suspension of the salt of the electropositive metal as well, to carbonate and/or hydrogencarbonate and/or hydroxide formed in the combustion of reaction gas and electropositive metal is greater than 10:1, greater than 25:1, or even greater than 50:1, in order to obtain sufficient gaseous constituents from the mixture that has been mixed with water and/or the aqueous solution and/or suspension of a salt of the electropositive metal, and hence to be able to effectively remove the gaseous constituents, for example $H_2$ and/or CO, and hence heat.

In some embodiments, the at least partial conversion of the energy from the gaseous constituents to electrical energy is effected by means of at least one turbine and at least one generator. The type of turbine and type of generator are not particularly restricted here, as also above in the case of the heat exchanger. In particular embodiments, it is possible for at least two turbines in succession in flow direction of the gaseous constituents to be used in the at least partial conversion of energy, for example including an expander turbine and a steam turbine. For example, energy can be converted with a gas turbine by the combustion of a component and then the gaseous constituents can be used for energy conversion in a steam turbine, meaning that the gaseous constituents pass successively (in sequence) through two or even more turbines.

In some embodiments, the electropositive metal is combusted with an excess of water and/or carbon dioxide. In some embodiments, the excess water and/or carbon dioxide can be separated from the gaseous constituents after the combustion and recycled to the combustion because it has been correspondingly preheated.

It is also possible, for example, to provide a return line and/or a return unit which recycle water and/or carbon dioxide and/or CO and/or hydrogen, on completion of removal from the gaseous constituents—for example also upstream of and/or in a second unit for conversion of energy—to the reaction and/or first removal. For example, these gases can be supplied to the first reactor (1) and/or to the at least one second feed unit (3) for reaction gas comprising carbon dioxide and/or water and/or to the second reactor (4) and/or to the at least one second atomization unit and/or nebulization unit (5) for atomizing and/or nebulizing water and/or to the aqueous solution and/or suspension of a salt of the electropositive metal and/or to the at least one third feed unit for water and/or an aqueous solution and/or suspension of a salt of the electropositive metal.

The return channel here can adjust the ratio of $H_2$ (CO) to $H_2O$ ($CO_2$) used. In the steady-state, the method can run, for example, with appropriate nozzle design, effectively with wet CO or $H_2$ as "carrier gas". The mixing ratios of recycled gas can, for example, also determine the thermal stability of a turbine which is operated at least partly with the gaseous constituents.

In addition to the at least partial conversion of energy from the gaseous constituents, it is also possible to enable chemical utilization of the CO and/or $H_2$ gases formed. For example, the gaseous constituents, optionally after washing, for example to scrub out $CO_2$, and/or drying of the gaseous constituents, can be used to feed a Fischer-Tropsch synthesis apparatus, where higher-value chemical products such as methanol, ethanol, hydrocarbons etc., can be produced from the synthesis gas comprising CO and $H_2$. If appropriate, it is also possible for this purpose to feed $H_2$ and/or CO and/or $H_2O$ from external sources to the gaseous constituents. Gas scrubbing can be effected, for example, with water and/or a solution and/or suspension of a salt of the electropositive metal, for example LiOH.

In contrast with synthesis gas produced from coal or natural gas, the gases prepared in the above embodiments do not contain any nitrogen- or sulfur-containing impurities such as $NH_3$, HCN, $H_2S$, COS or oxygen, which have to be removed at great cost and inconvenience. It may be that the only impurity that needs to be removed is $CO_2$. Since hydroxide is also available in the plant, this can then be utilized for scrubbing of $CO_2$. Such a scrubber is very effective.

After any drying of the gases, it is possible to obtain a high-purity synthesis gas mixture having an adjustable CO/$H_2$ ratio for processing according to Fischer-Tropsch. According to the catalyst, for example, methanol or hydrocarbons are obtainable.

Some embodiments may include a method with a reaction gas that contains only $CO_2$ or $H_2O$, such that, in the case of chemical utilization of the gaseous constituents, the other gas component of the synthesis gas has to be provided, for example even from an intermediate storage means, when an apparatus of the invention is being operated alternately with a reaction gas comprising $H_2O$ and a reaction gas comprising $CO_2$, and the gaseous constituents formed are being correspondingly removed and stored intermediately.

It is also possible to operate two apparatuses in parallel with two methods, in which case a reaction gas comprising $CO_2$ is used in one method and a reaction gas comprising $H_2O$ in the other, and the gaseous constituents produced can then be suitably combined for a Fischer-Tropsch synthesis.

In some embodiments, it is also possible to employ a method in which the reaction gas contains a mixture of carbon dioxide and water, e.g., is a mixture of carbon dioxide and water, such that both CO and $H_2$ are formed as gaseous constituents for a Fischer-Tropsch process. In this case, however, suitable establishment of the correct synthesis gas composition should be ensured. It is thus also possible to conduct a method which can be regarded as being similar to a method in an IGCC plant, except that the fuel used here is the electropositive metal.

In some embodiments, the present disclosure enables an apparatus for producing ammonia and energy, having: a first reactor in which an electropositive metal selected from alkali metals, alkaline earth metals and zinc, and mixtures and/or alloys thereof, is allowed to react with a reaction gas comprising carbon dioxide and/or water, said reactor being designed to react the reaction gas comprising carbon dioxide and/or water with the electropositive metal; at least one first atomization unit and/or nebulization unit for atomizing and/or nebulizing the electropositive metal, said unit being designed to atomize and/or nebulize the electropositive metal into the first reactor; at least one first feed unit for the electropositive metal, said unit being designed to feed the electropositive metal to the at least one first atomization unit and/or nebulization unit; at least one second feed unit for reaction gas comprising carbon dioxide and/or water, said unit being designed to feed the first reactor with the reaction gas comprising carbon dioxide and/or water; a second reactor in which the reacted mixture of reaction gas and electropositive metal is mixed with water and/or an aqueous solution and/or suspension of a salt of the electropositive metal, said reactor being designed to mix the reacted mixture of reaction gas and electropositive metal with water and/or the aqueous solution and/or suspension of a salt of the electropositive metal; at least one second atomization unit and/or nebulization unit for atomizing and/or nebulizing water and/or the aqueous solution and/or suspension of a salt of the electropositive metal, said unit being designed to atomize and/or nebulize water and/or the aqueous solution and/or suspension of a salt of the electropositive metal into the second reactor; at least one third feed unit for water and/or an aqueous solution and/or suspension of a salt of the electropositive metal, said unit being designed to feed the at least one second atomization unit and/or nebulization unit with water and/or the aqueous solution and/or suspension of a salt of the electropositive metal; a first separation unit in which the mixture that has been mixed with water and/or the aqueous solution and/or suspension of a salt of the electropositive metal is separated into solid and/or liquid constituents on the one hand and gaseous constituents on the other hand, said unit being designed to separate the mixture that has been mixed with water and/or the aqueous solution and/or suspension of a salt of the electropositive metal into solid and/or liquid constituents on the one hand and gaseous constituents on the other hand; at least one first unit for conversion of energy, said unit being designed to at least partly convert or remove the energy from the solid and/or liquid constituents; and at least one second unit for conversion of energy, said unit being designed to at least partly convert or remove the energy from the gaseous constituents.

In some embodiments, there may be a second separation unit in which water and/or carbon dioxide is separated from the gaseous constituents, said separation unit being designed to separate water and/or carbon dioxide from the gaseous constituents. These can then, for example, be recycled to the reaction. The first reactor and the second reactor are not particularly restricted with regard to the construction and material thereof, etc., provided that the corresponding reactions can proceed therein. Depending on the type, characteristics (e.g., temperature, pressure) and/or amount of each of the reaction gas, the electropositive metal, the water or the aqueous solution of a salt of the electropositive metal, etc., these may be configured correspondingly. The separation units, feed units, atomization units, any removal units and recycle units, etc., are likewise not particularly restricted. For example, the first reactor may be a combustion chamber or a combustion tube.

An example of a suitable material for the first and/or second reactor, the separation units, atomization units and/or nebulization units and/or any removal units and/or any feed units, or else, for example, apparatuses for converting energy such as turbines that are coupled to generators, in particular embodiments, is a material selected from the group consisting of iron, chromium, nickel, niobium, tantalum, molybdenum, tungsten, zirconium, and alloys of these metals, and also steels such as stainless steel and chromium-nickel steel. These materials may be used at relatively high temperatures at which the reaction with liquid electropositive metal, for example, can proceed more easily or the reaction mixture can be treated easily. In particular embodiments, the supply of water and/or the aqueous solution and/or suspension of a salt of the electropositive metal in the second reactor can result in lowering of the temperature of the reaction mixture to the effect that the portions downstream in flow direction are exposed to a lower temperature, such that they can also be made from less thermally stable materials.

The first feed unit used for the electropositive metal may comprise tubes, hoses, or conveyor belts, which may be heated, which can be determined in a suitable manner, for example, on the basis of the state of matter of the electropositive metal. For instance, the alkaline earth metals, for example Mg and Ca, can be supplied, for example, in particular embodiments, in particle form, for example in powder form, whereas Li can be supplied, for example, in liquid form. If necessary, a further feed unit for a gas, optionally with a control unit such as a valve, may be mounted on the first feed unit for the electropositive metal, and the valve can be used to regulate the supply of the electropositive metal. The second feed unit for the reaction gas may likewise be configured as a tube or hose, etc., which may optionally be heated, in which case a suitable second feed unit can suitably be determined on the basis of the state of the gas, which may optionally also be under pressure.

It is also possible for two or more first and/or second feed units to be provided for electropositive metal and/or reaction gas. In addition, the third feed unit for water and/or the aqueous solution and/or suspension of a salt of the electropositive metal may take the form of a tube or hose etc., which may optionally be heated, and a suitable third feed unit can likewise be determined on the basis of the state of the water and/or the aqueous solution and/or suspension of a salt of the electropositive metal, which may optionally also be under pressure. It is also possible for two or more third feed units for water and/or the aqueous solution and/or suspension of a salt of the electropositive metal to be provided.

Some embodiments may include, upstream of or in the first reactor, an ignition apparatus to ignite the reaction gas and/or the electropositive metal and thus to start the reaction. The ignition apparatus may comprise, for example, a high-voltage source, a light arc, etc.

The first and second atomization unit and/or nebulization unit are may be chosen so that the respective substances, e.g., the electropositive metal and water and/or the aqueous solution and/or suspension of a salt of the electropositive metal, can be atomized or nebulized therein. In some embodiments, they are made from a material that is not attacked by the substances, for example an alkali-resistant atomization unit and/or nebulization unit, if the second atomization unit and/or nebulization unit is used to atomize an aqueous solution and/or suspension of a salt of the electropositive metal. This likewise applies to the corresponding feed units. In some embodiments, the atomization and/or nebulization is effected in such a way that the electropositive metal or water and/or the aqueous solution and/or suspension of a salt of the electropositive metal are atomized or nebulized very substantially into the reaction gas or the reacted mixture, which can be achieved by appropriate construction of the atomization unit and/or nebulization unit, comprising, for example, appropriate nozzles or nebulizers.

In some embodiments, the first and second feed unit meet upstream of the first atomization unit and the electropositive metal is atomized together with the reaction gas. In some embodiments, the separation units provide separation into solid and/or liquid constituents on the one hand and gaseous constituents on the other hand in the first separation unit and carbon dioxide and/or water can be removed in the second separation unit. In this context, the second separation unit may also be within the second unit for conversion of energy, and the first separation unit may also be within the second reactor. It is also possible for the first and second reactor to be present in a continuous integrated vessel or the like.

The first separation unit may provide that separation into gaseous constituents on the one hand and solid and/or liquid constituents on the other hand can be ensured. In the apparatus of the invention, the first separation unit, in particular embodiments, has a cyclone and/or at least one filter plate and/or at least one electrostatic filter. Some embodiments may include combinations of these separation units. The cyclone/cyclone reactor may, for example, have a form as possessed by standard cyclone reactors.

For example, a cyclone reactor may comprise a reaction region which may also correspond to the second reactor, for example in the form of a rotationally symmetric upper section, a separation region having a conical configuration, for example, and an expansion chamber in which there may be mounted at least one removal apparatus for solid and/or liquid constituents, for example in the form of a star feeder, and at least one removal unit for gaseous constituents.

A cyclone reactor may alternatively have a different construction and may comprise further regions. For example, individual regions (for example reaction region, separation region, expansion chamber) may be combined in one component of an illustrative cyclone reactor and/or may extend over two or more components of a cyclone reactor. In some embodiments, one or more feed units for water and/or a solution and/or suspension of a salt of the electropositive metal are present within the cyclone.

The filter plates and/or electrostatic filters, which may include filter tubes, may be used, for example, in conjunction with a cyclone. In some embodiments, the filter plates or tubes may contain a feed of water in order to hydrolyze or wash out the precipitated solids. The filters, filter plates and/or electrostatic filters can, like the cyclone as well, be manufactured from the corrosion-resistant materials mentioned, for example, a material selected from the group consisting of iron, chromium, nickel, niobium, tantalum, molybdenum, tungsten, zirconium and alloys of these metals, and also steels such as stainless steel and chromium-nickel steel.

In some embodiments, the at least one first unit for conversion of energy has at least one heat exchanger. The latter may be coupled, for example, to at least one turbine and at least one generator for generation of electrical energy, but can also additionally or even solely be used for conversion to thermal energy.

In some embodiments, the apparatus may include a control unit that sets the molar ratio of water and/or the aqueous solution and/or suspension of a salt of the electropositive metal to hydroxide and/or carbonate/hydrogencarbonate formed in the combustion of reaction gas and electropositive metal by controlling the at least one first feed unit for electropositive metal and/or the at least one second feed unit for reaction gas comprising carbon dioxide and/or water and/or the at least one third feed unit for water and/or the aqueous solution and/or suspension of a salt of the electropositive metal in such a way that the molar ratio of water and/or the aqueous solution and/or suspension of a salt of the electropositive metal to carbonate and/or hydrogencarbonate and/or hydroxide formed in the combustion of reaction gas and electropositive metal is greater than 2:1, greater than 3:1, or greater than 3.5:1. In particular embodiments, the control unit can also set the molar ratio of water, for example in the solution and/or suspension of the salt of the electropositive metal as well, to carbonate and/or hydrogencarbonate and/or hydroxide formed in the combustion of reaction gas and electropositive metal at greater than 10:1, greater than 25:1, or greater than 50:1, to obtain sufficient gaseous constituents from the mixture that has been mixed with water and/or the aqueous solution and/or suspension of a salt of the electropositive metal.

The control unit here can, for example, via control of nozzles, for example on or in the feed units or the reactors respectively, control the addition of electropositive metal, reaction gas, water, the aqueous solution, suspension of a salt of the electropositive metal, and/or the feed units themselves, for example by control of pumps, etc., to establish the corresponding molar ratio.

In some embodiments, the at least one second unit for conversion of energy has at least one turbine and at least one generator for generation of electrical energy. The turbine and generator, as is also the case above in the case of coupling with the heat exchanger, may employ various different turbines connected to one or more generators. In particular embodiments, the at least one second unit for conversion of energy has at least two turbines in series in flow direction of the gaseous constituents. However, it is also possible to remove heat from the gaseous constituents by means of a heat exchanger, and in that case a generator is not necessary. Combinations of turbines and heat exchangers are also possible.

In some embodiments, the second separation unit may be designed such that water and/or carbon dioxide are separated from the gaseous constituents. Some embodiments with separation of carbon dioxide and/or water, may include a recycle unit for carbon dioxide and/or water from the second separation unit. The recycle unit may feed carbon dioxide and/or water from the second separation unit to the second feed unit for reaction gas comprising carbon dioxide and/or water and/or the first reactor. In this way, it is possible to provide excess carbon dioxide and/or water again as reaction gas, such that the method of the invention can be conducted more effectively. The recycled carbon dioxide and/or water can be preheated in particular embodiments.

Some embodiments further comprise a return line, a return valve, and at least one fourth feed unit for water and/or $H_2$ and/or carbon dioxide and/or CO, wherein water and/or $H_2$ and/or carbon dioxide and/or CO are at least partly removed from the gaseous constituents via the return valve, are recycled via the return line and are fed via the at least one fourth feed unit to the first reactor and/or to the at least one second feed unit for reaction gas comprising carbon dioxide and/or water and/or to the second reactor and/or to the at least one second atomization unit and/or nebulization unit for atomization and/or nebulization of water and/or the aqueous solution and/or suspension of a salt of the electropositive metal and/or to the at least one third feed unit for water and/or an aqueous solution and/or suspension of a salt of the electropositive metal. In this way, the gaseous constituents can be reused.

Some embodiments may include, for generation of energy, at least one $CO_2$ scrubber and/or a fifth feed unit for CO and/or $H_2$ and/or $H_2O$ and/or a drier and/or a Fischer-Tropsch synthesis apparatus. In such an apparatus, the electropositive metal thus serves partly as fuel. As explained, it is also possible for two apparatuses to generate energy, one of which uses a reaction gas comprising water and the other a reaction gas comprising carbon dioxide, when a Fischer-Tropsch synthesis is to be connected. The at least one $CO_2$ scrubber and/or the at least one fifth feed unit for CO and/or $H_2$ and/or $H_2O$ and/or the at least one drier and/or the Fischer-Tropsch synthesis apparatus may be standard apparatuses or components.

The above embodiments, configurations, and developments can, if appropriate, be combined with one another as desired. Further possible configurations, developments and implementations of the invention also include combinations that have not been explicitly specified of features of the invention that have been described above or are described hereinafter with regard to the working examples. More particularly, the person skilled in the art will also add individual aspects as improvements or additions to the respective basic form of the present invention.

The invention is now illustrated hereinafter with reference to illustrative embodiments that do not restrict the scope of the disclosure in any way. A first illustrative embodiment is shown in schematic form in FIG. 1.

First of all, in a first reactor 1, for example a combustion tube, combustion of an electropositive metal, for example lithium or magnesium, takes place, the latter being fed by a first feed unit 2 for electropositive metal and a first atomization and/or nebulization unit 2a to the first reactor 1, with a reaction gas comprising carbon dioxide and/or water. The combustion can take place, for example, in a corresponding atmosphere which may also consist, for example, of carbon dioxide and/or water only. The reaction gas is fed to the first reactor 1 by one or more second feed units 3 for reaction gas. The amount of carbon dioxide and/or water may, as already described, be chosen such that the burner is not overheated overall. For this purpose, for example, there may be an integrated valve that can regulate the carbon dioxide and/or water content of the reaction gas or of the gaseous products formed or the reaction gas volume for the combustion, and hence also for an ultimately operated gas turbine. It is possible, for example, for a mixture of gas and solids, such as carbon dioxide and/or CO and/or water and/or $H_2$ and lithium carbonate and/or lithium hydroxide or magnesium carbonate and/or magnesium hydroxide to arise as a result of the combustion.

The reacted mixture of the electropositive metal and reaction gas is then passed into the second reactor 4, where it is sprayed from one or more second atomization units and/or nebulization units 5, for example water nozzles, with water and/or an aqueous solution and/or suspension of a salt of the electropositive metal. This mixture is then separated in a first separation unit 6, for example a cyclone 6a, into solid and/or liquid constituents 7 on the one hand and gaseous constituents 8 on the other hand.

The solid and/or liquid constituents 7 formed from this mixture, for example an LiOH solution or magnesium hydroxide suspension or corresponding carbonate solution/suspension, can then release heat in a first unit 9 for conversion of energy, comprising, for example, a heat exchanger 9a, a steam turbine 9b and a generator 9c, and thus, for example, generate electricity, before they can be recovered as product of value, recycled and/or used for recovery of the electropositive metal.

The gaseous constituents 8, for example $H_2/H_2O/CO/CO_2$, which may be under pressure, can be passed into a second unit 10 for conversion of energy, for example having an expander turbine 10a and a generator 10b, and also a turbine 10c and a generator 10d, in order to generate electricity, in which case, for example, water can be suitably removed here, for example with the aid of a condenser 11. In addition, carbon dioxide and/or water can be separated from the gaseous constituents, and can then, for example, be provided again to the second feed unit 3 via a recycle line 13. Via a return line (12), a return valve (12a) and a fourth feed unit (12b), the first reactor (1) can also be supplied with $H_2$ and/or $H_2O$ and/or CO and/or $CO_2$ from the gaseous constituents, although these can also be fed back in elsewhere, for example in the second reactor (4).

Figure 2:
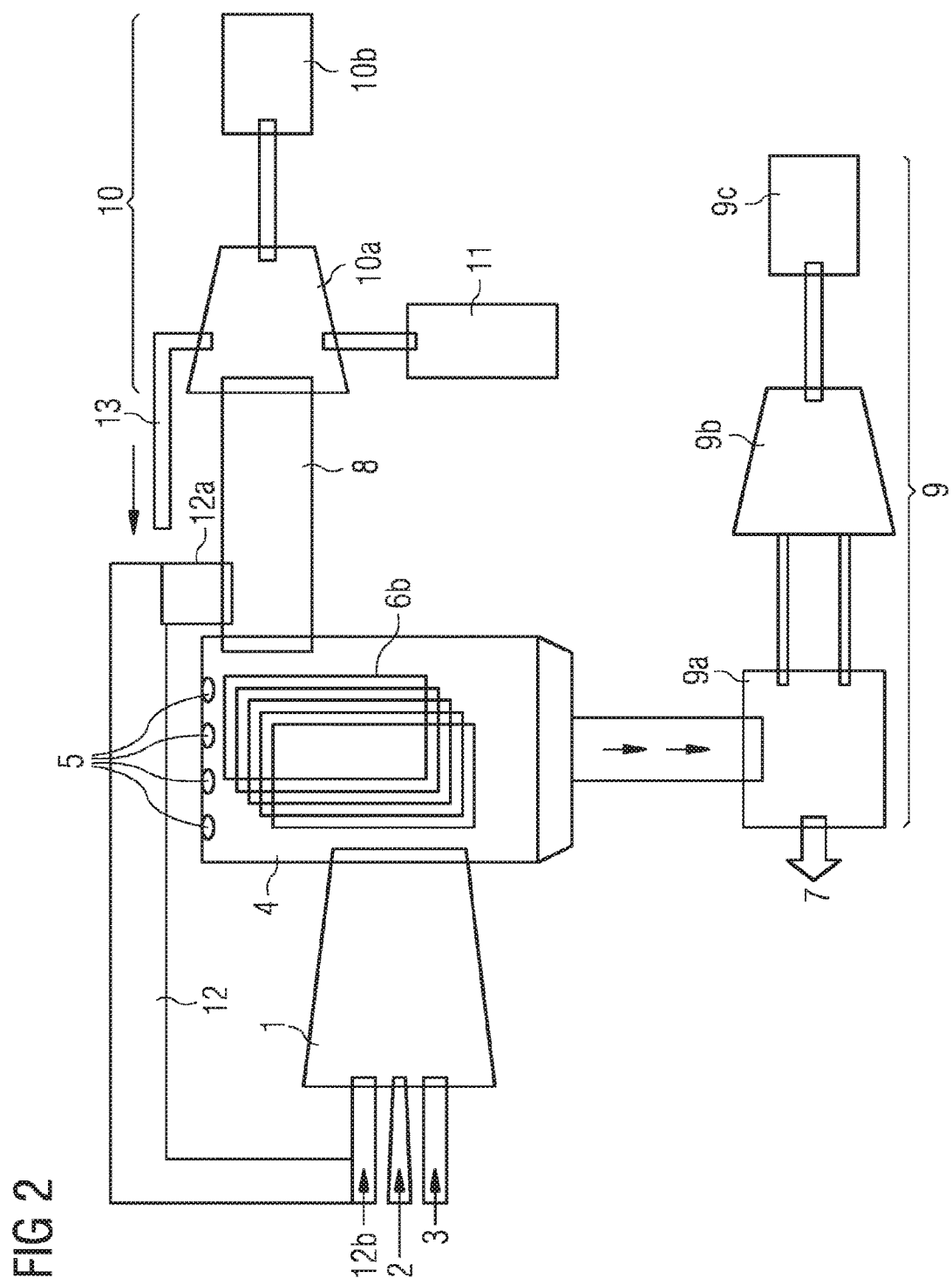
FIG. 2 shows, in schematic form, a second illustrative embodiment of an apparatus of the invention in the form of a coupled combined cycle/alkali metal power plant for generation of electricity with an electrostatic precipitator for removal of the gaseous products in accordance with the teachings of the present disclosure.

A second illustrative embodiment is shown in FIG. 2, which differs from the embodiment in FIG. 1 by the arrangement of the reactors 1, 4 and of the second atomization units/nebulization units 5, and in that an electrostatic filter 6b is used as the first separation unit 6 in place of the cyclone 6a. In this case, the electrostatic filter 6b, in particular embodiments, may also itself have, for example, nozzles for supply of water and/or an aqueous solution and/or suspension of a salt of the electropositive metal. Also provided in place of the two turbines (10a; 10c) and two generators (10b; 10d) are only one turbine (10a) and one generator (10b).

A third illustrative embodiment of an apparatus of the invention is shown in FIG. 3, in which the gaseous constituents (8) from the apparatus from FIG. 1 or FIG. 2, which is not shown in any further detail, after removal of energy, for example by means of a heat exchanger and/or a turbine, are provided to a filter vessel (6c) with nozzles (5a) for spraying-in an aqueous solution/suspension of a salt of the electropositive metal such as lithium hydroxide for $CO_2$ scrubbing, then the gas is dried in the drier (15) and then sent to a Fischer-Tropsch synthesis apparatus (16), from which comparatively valuable chemical products (17) such as methanol or gasoline, etc. can be withdrawn. By means of a fifth feed unit (14), if required, CO and/or $H_2$ and/or $H_2O$ deficient in the synthesis gas can be supplied.

The solid and/or liquid combustion products can be removed here by means of aqueous suspensions/solutions, which allows a simple reaction regime. The salt solutions/suspensions formed are so hot that they can additionally operate a steam turbine via a heat exchanger. The present disclosure enables effective methods of generating energy. The process sequence is enabled by the high energy density of the electropositive metals. Overall, an apparatus of the invention, for example a power plant, can be operated in a virtually emissions-free manner, it being possible to utilize all products. If two plants are combined with one another or one plant is provided with an intermediate storage means, an extension of the plant also enables chemical utilization of the $H_2$ or CO formed in the manner of any desired Fischer-Tropsch-type synthesis.

By contrast with the production of synthesis gas from fossil fuels, no nitrogen- or sulfur-containing impurities such as $NH_3$, HCN, $H_2S$, COS or oxygen are present here in the gas, which would then be removed in a costly and inconvenient manner.

a. In the combustion and hydrolysis plant component, a pressurized $H_2/H_2O$ or $CO/H_2O$ gas mixture is produced, which can drive a gas turbine for generation of electricity.

b. The resultant ash of hydroxide and/or carbonate and/or hydrogencarbonate of the electropositive metal is washed out of the combustion chamber as a solution/suspension. Since the plant is under high pressure, this solution is so hot that it can drive a steam turbine via a heat exchanger.

c. Such a power plant is emissions-free on operation with $H_2O$.

The invention claimed is:

1. A method of generating energy, the method comprising:
atomizing or nebulizing an electropositive metal into a first reactor, the electropositive metal selected from the group consisting of: alkali metals, alkaline earth metals, aluminum, zinc;
feeding a reaction gas into the first reactor, the reaction gas comprising carbon dioxide or water;
combusting the reaction gas and the atomized or nebulized electropositive metal in the first reactor;
feeding resulting combustion products into a second reactor;
atomizing or nebulizing water, or an aqueous solution, or a suspension of a salt of the electropositive metal into the second reactor;
separating a mixture from the second reactor into (a) solid and liquid constituents and (b) gaseous constituents;
converting energy from the solid and liquid constituents; and
converting energy from the gaseous constituents.

2. The method as claimed in claim 1, wherein separating the resulting mixture includes using a cyclone, filter plates, or electrostatic filters.

3. The method as claimed in claim 1, wherein at least partially converting the energy from the solid and liquid constituents includes using at least one heat exchanger.

4. The method as claimed in claim 1, wherein the at least partially converting energy from the gaseous constituents to electrical energy includes using at least one turbine and at least one generator.

5. The method as claimed in claim 1, further comprising combusting electropositive metal with an excess of carbon dioxide and/or water.

6. The method as claimed in claim 5, further comprising separating excess carbon dioxide or excess water from the gaseous constituents after the combustion and recycling the excess to the combustion process.

7. An apparatus for generating energy, the apparatus comprising:
a first reactor for reacting an electropositive metal with a reaction gas, the electropositive metal selected from the group consisting of: alkali metals, alkaline earth metals, aluminum, zinc, mixtures, and/or alloys thereof; the reaction gas comprises carbon dioxide or water;
at least one first atomization unit or nebulization unit for atomizing or nebulizing the electropositive metal into the first reactor;
at least one first feed unit to feed the electropositive metal to the at least one first atomization unit or nebulization unit;
at least one second feed unit to feed the first reactor with the reaction gas;
a second reactor to mix a resulting mixture of reaction gas and electropositive metal with water, or an aqueous solution, or a suspension of a salt of the electropositive metal;
at least one second atomization unit or nebulization unit to atomize or nebulize the water, or the aqueous solution, or the suspension of a salt of the electropositive metal into the second reactor;
at least one third feed unit to feed the at least one second atomization unit or nebulization unit with the water, or the aqueous solution, or the suspension of a salt of the electropositive metal;
a first separation unit to separate the mixture from the second reactor into (a) solid and liquid constituents and (b) gaseous constituents;
at least one first unit to at least partly convert the energy from the solid and liquid constituents; and
at least one second unit to at least partly convert the energy from the gaseous constituents.

8. The apparatus as claimed in claim 7, further comprising a second separation unit to separate water or carbon dioxide from the gaseous constituents.

9. The apparatus as claimed in claim 7, wherein the first separation unit comprises a cyclone, or at least one filter plate, or at least one electrostatic filter.

10. The apparatus as claimed in claim 7, wherein the at least one first unit comprises at least one heat exchanger.

11. The apparatus as claimed in claim 7, wherein the at least one second unit includes at least one turbine and at least one generator for generation of electrical energy.

12. The apparatus as claimed in claim 8, further comprising a recycle unit to feed the water or carbon dioxide from the second separation unit to the second feed unit for reaction gas or to the first reactor.

13. The apparatus as claimed in claim 7, further comprising a return line, a return valve, and at least one fourth feed unit for byproducts including water or $H_2$ or carbon dioxide or CO;
wherein the byproducts are at least partly removed from the gaseous constituents via the return valve, are recycled via the return line, and are fed via the at least one fourth feed unit to the first reactor or to the at least one second feed unit or to the second reactor or to the at least one second atomization unit or nebulization unit or to the at least one third feed unit.

14. The apparatus as claimed in claim 7, further comprising at least one $CO_2$ scrubber.

15. The apparatus as claimed in claim 7, further comprising at least one fifth feed unit for CO or $H_2$ or $H_2O$.

16. The apparatus as claimed in claim 7, further comprising at least one drier.

17. The apparatus as claimed in claim 7, further comprising a Fischer-Tropsch synthesis apparatus.

* * * * *